(12) United States Patent
Zhang et al.

(10) Patent No.: US 12,477,567 B2
(45) Date of Patent: Nov. 18, 2025

(54) REDUCTION OF LATENCY IN WIRELESS COMMUNICATION SYSTEMS

(71) Applicant: Apple Inc., Cupertino, CA (US)

(72) Inventors: Lijie Zhang, Beijing (CN); Qiang Miao, Beijing (CN); Zhiwei Wang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/011,413

(22) PCT Filed: Dec. 22, 2021

(86) PCT No.: PCT/CN2021/140499
§ 371 (c)(1),
(2) Date: Jun. 29, 2023

(87) PCT Pub. No.: WO2023/115391
PCT Pub. Date: Jun. 29, 2023

(65) Prior Publication Data
US 2023/0354394 A1   Nov. 2, 2023

(51) Int. Cl.
*H04W 72/54* (2023.01)
*H04W 28/02* (2009.01)
*H04W 72/1263* (2023.01)
*H04W 72/1268* (2023.01)
*H04W 76/28* (2018.01)

(52) U.S. Cl.
CPC ....... *H04W 72/54* (2023.01); *H04W 28/0236* (2013.01); *H04W 72/1263* (2013.01); *H04W 72/1268* (2013.01); *H04W 76/28* (2018.02)

(58) Field of Classification Search
None
See application file for complete search history.

(56) References Cited

U.S. PATENT DOCUMENTS

| | | | |
|---|---|---|---|
| 2021/0105762 A1* | 4/2021 | Pezeshki | H04W 72/12 |
| 2023/0113042 A1* | 4/2023 | Liberg | H04W 56/0045 |
| | | | 455/427 |
| 2023/0126623 A1* | 4/2023 | Schiocchet | H04W 72/0446 |
| | | | 370/311 |
| 2023/0354317 A1* | 11/2023 | Liu | H04W 72/1268 |
| 2024/0236941 A1* | 7/2024 | Esswie | H04W 52/0216 |

FOREIGN PATENT DOCUMENTS

| | | |
|---|---|---|
| CN | 108322280 | 7/2018 |
| EP | 2983324 | 2/2016 |
| WO | WO 2018015425 | 1/2018 |
| WO | WO 2019192606 | 10/2019 |

* cited by examiner

*Primary Examiner* — Jutai Kao
(74) *Attorney, Agent, or Firm* — Fish & Richardson P.C.

(57) ABSTRACT

Disclosed are methods, systems, and computer-readable medium to perform operations including: receiving, from an application layer of a user equipment (UE), a first uplink packet at a first time; identifying a latency between the first time and a first instance of a periodic transmission resource during which the first uplink packet is transmitted by the UE; and providing information indicative of the latency to the application layer of the UE.

20 Claims, 12 Drawing Sheets

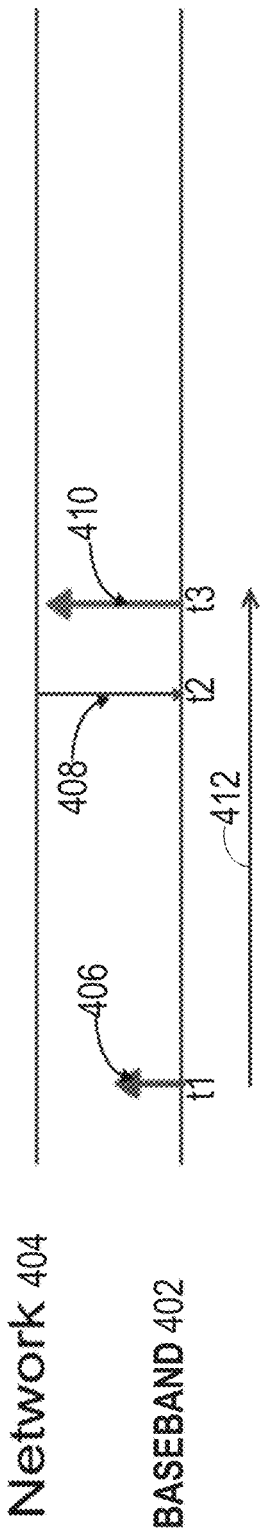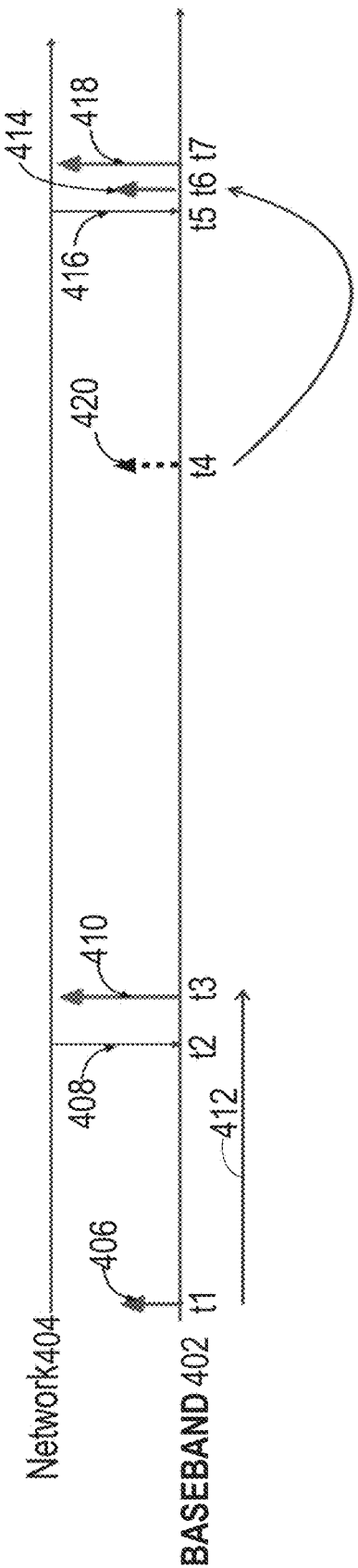

REDUCTION OF LATENCY IN WIRELESS COMMUNICATION SYSTEMS

CROSS-REFERENCE TO RELATED APPLICATIONS

This application claims priority under 35 U.S.C. 371 to International Application No. PCT/CN2021/140499, filed on Dec. 22, 2021, the entire contents of which is hereby incorporated by reference.

TECHNICAL FIELD

This disclosure generally relates to reduction of latency in wireless communication systems.

BACKGROUND

Wireless communication networks provide integrated communication platforms and telecommunication services to wireless user devices. Example telecommunication services include telephony, data (e.g., voice, audio, and/or video data), messaging, internet-access, and/or other services. The wireless communication networks have wireless access nodes that exchange wireless signals with the wireless user devices using wireless network protocols, such as protocols described in various telecommunication standards promulgated by the Third Generation Partnership Project (3GPP). Example wireless communication networks include code division multiple access (CDMA) networks, time division multiple access (TDMA) networks, frequency-division multiple access (FDMA) networks, orthogonal frequency-division multiple access (OFDMA) networks, Long Term Evolution (LTE), and Fifth Generation New Radio (5G NR). The wireless communication networks facilitate mobile broadband service using technologies such as OFDM, multiple input multiple output (MIMO), advanced channel coding, massive MIMO, beamforming, and/or other features.

SUMMARY

The present disclosure is directed towards methods, systems, apparatus, computer programs, or combinations thereof, for reducing latency in wireless communication systems. In some embodiments, a user equipment (UE) is configured to perform a remedial action in response to detecting a latency, for example, in scenarios that involve a periodic transmission of uplink (UL) data (e.g., an UL packet). In one example, the latency is between a time at which UL data is ready for transmission and a time at which the UE transmits the UL data. In response to detecting the latency, the UE is configured to provide information indicative of the latency to an application layer of the UE that generated the uplink data. The information indicative of the latency can include a value of the latency in milliseconds. Additionally and/or alternatively, the information indicative of the latency can include an instruction to adjust a data sampling time by the application layer. In one embodiment, the application layer of the UE is configured to adjust a sampling time of the UL data based on the received information.

In accordance with one aspect of the present disclosure, a method to be performed by a user equipment (UE) is disclosed. The method involves receiving, from an application layer of the UE, a first uplink packet at a first time; identifying a latency between the first time and a first instance of a periodic transmission resource during which the first uplink packet is transmitted by the UE; and providing information indicative of the latency to the application layer of the UE.

The previously-described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, the latency is a first latency, and the method further involves receiving, from the application layer, a second uplink packet at a second time, wherein a second latency between the second time and a second instance of the periodic transmission resource is smaller than the first latency.

In some implementations, the information indicative of the latency comprises a value of the latency in milliseconds.

In some implementations, the information indicative of the latency comprises an instruction to adjust a packet sampling time by the application layer.

In some implementations, the method further involves receiving, at a second time, a first configured grant (CG) that schedules the first instance of the periodic transmission resource, wherein the second time occurs after the first time.

In some implementations, the method further involves receiving, at a third time, a second CG that schedules a second instance of the periodic transmission resource; receiving, from the application layer, a second uplink packet at a fourth time that occurs after the third time; and preparing the second uplink packet for transmission using the second instance of the periodic transmission resource.

In some implementations, the UE is operating in a cellular vehicle-to-everything (V2X) network, and the method further involves: selecting, for the periodic transmission resource, one or more time-frequency resources within a resource selection window.

In some implementations, the method further involves receiving connected mode discontinuous reception (CDRX) configuration information that defines a periodic CDRX ON duration; and receiving the first uplink packet between a first instance of the periodic CDRX ON duration and a second instance of the periodic CDRX ON duration.

In some implementations, the method further involves receiving, during the second instance of the periodic CDRX ON duration, an uplink grant that schedules the first instance of the periodic transmission resource, where a second instance of the periodic transmission resource occurs during the first instance of the CDRX ON period.

In some implementations, the periodic transmission resource is scheduled within a Physical Uplink Shared Channel (PUSCH).

The details of one or more embodiments of these systems and methods are set forth in the accompanying drawings and the description below. Other features, objects, and advantages of these systems and methods will be apparent from the description and drawings, and from the claims

BRIEF DESCRIPTION OF DRAWINGS

FIGS. 4A, 4B illustrate a solution for reducing latency in voice/video communications, according to some implementations of the present disclosure.

Like reference symbols in the various drawings indicate like elements.

DETAILED DESCRIPTION

This disclosure describes methods and systems for reducing latency in wireless communication systems. In some embodiments, the methods and systems can be used to reduce latency that occurs in scenarios that involve a periodic transmission of uplink (UL) data. Such scenarios include communications in a vehicle-to-everything (V2X) network, communications using voice-over-cellular technology, and voice/video communications using configured grants (CGs). Note that the disclosed methods and systems are not limited to these scenarios and can be applied to any number of scenarios in wireless communication systems.

Figure 1:
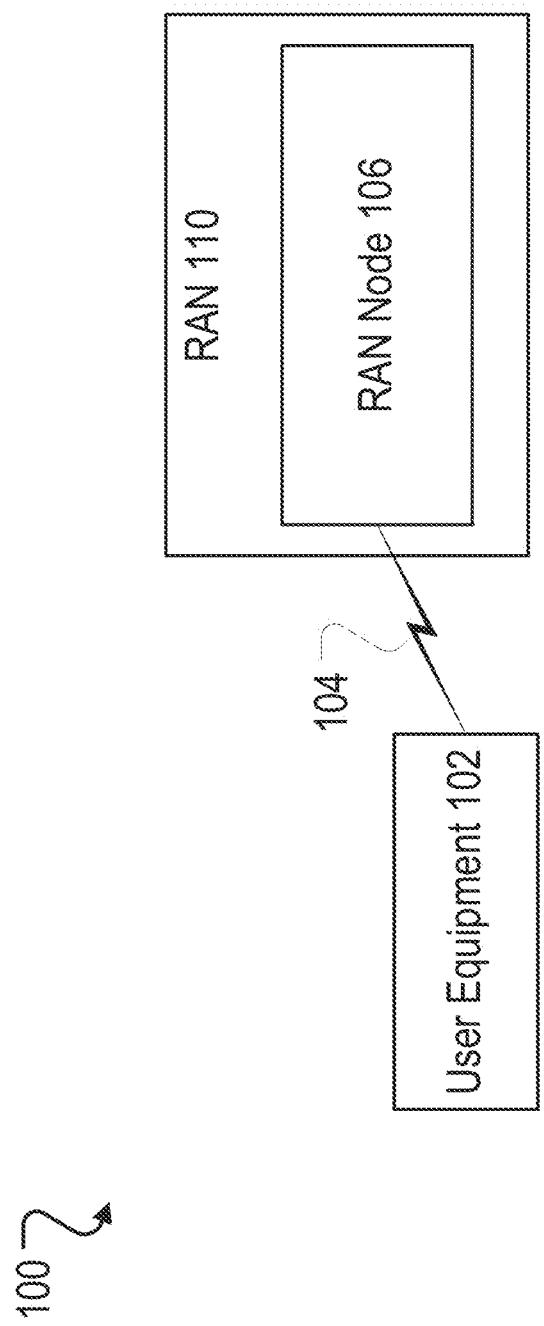
FIG. 1 illustrates an example wireless communication system, according to some implementations of the present disclosure.

FIG. 1 illustrates an example wireless communication system 100, according to some implementations. Without limitation, the wireless communication system 100 is described in the context of Long Term Evolution (LTE) and Fifth Generation (5G) New Radio (NR) communication standards as defined by the Third Generation Partnership Project (3GPP) technical specifications. More specifically, the wireless communication system 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks.

However, the wireless communication system 100 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

As shown in FIG. 1, the wireless communication system 100 includes a UE 102 and a radio access network (RAN) 110. The UE 102 may be a smartphone (e.g., handheld touchscreen mobile computing devices connectable to one or more cellular networks), or any mobile or non-mobile computing device, such as a consumer electronics device, cellular phone, smartphone, feature phone, tablet computer, wearable computer device, networked or "smart" appliances, MTC devices, M2M, IoT devices, and/or the like.

The UE 102 may be configured to connect, for example, communicatively couple, with the RAN 110. In embodiments, the RAN 110 may be an NG RAN or a 5G RAN, an E-UTRAN, or a legacy RAN, such as a UTRAN or GERAN. As used herein, the term "NG RAN" or the like may refer to a RAN 110 that operates in an NR or 5G system 100, and the term "E-UTRAN" or the like may refer to a RAN 110 that operates in an LTE or 4G system 100. The UE 102 utilizes connection (or channel) 104, which comprises a physical communications interface or layer.

The RAN 110 can include one or more AN nodes or RAN nodes 106 that enable the connection 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 106 that operates in an NR or 5G system 100 (for example, a gNB), and the term "E-UTRAN node" or the like may refer to a RAN node 106 that operates in an LTE or 4G system 100 (e.g., an eNB). According to various embodiments, the RAN node 106 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, the UE 102 is configured to perform a remedial action in response to detecting a latency, for example, in scenarios that involve a periodic transmission of UL data (e.g., an UL packet). In one example, the latency is between a time at which UL data is ready for transmission and a time at which the UE 102 transmits the UL data. In one embodiment, in response to detecting the latency, the UE 102 is configured to provide information indicative of the latency to an application layer of the UE 102 that generated the uplink data. The information indicative of the latency can include a value of the latency in milliseconds. Additionally and/or alternatively, the information indicative of the latency can include an instruction to adjust a data sampling time by the application layer. In one embodiment, the application layer of the UE 102 is configured to adjust a sampling time of the UL data based on the received information. Among other examples, the scenarios in which the UE 102 is configured to perform the remedial action include communications using a V2X network, communications using voice-over-cellular technology, and voice/video communications using CGs. These scenarios are described in more detail below.

Starting with V2X, since Release 14 of the LTE standard, 3GPP has adopted a PC5/sidelink interface to support V2X services. Generally, the PC5/sidelink supports two resource scheduling allocation modes: a network scheduling mode and a UE autonomous scheduling mode. The UE autonomous scheduling mode, which is the more widely adopted mode, is similar to the listen-before-talk (LBT) scheme in Wi-Fi. For example, in the UE autonomous scheduling mode, a transmitting UE (e.g., the UE 102) executes sensing or partial-sensing based resource selection. The transmitting UE periodically uses the selected resource for a specified reservation duration. In one example, the transmitting UE randomly selects one time-frequency resource for transmission from a threshold number of best candidates within the resource selection window (e.g., best 20% candidates within the resource selection window).

However, a transmitting UE operating in the UE autonomous scheduling mode is prone to latency issues. As one example, latency occurs when the transmitting UE randomly selects a resource from the resource selection window. In particular, the latency occurs between the start of the resource reservation window (i.e., the earliest time at which the transmitting UE can transmit UL data) and the selected resource (i.e., the time at which the transmitting UE transmits the UL data).

Figure 2A:
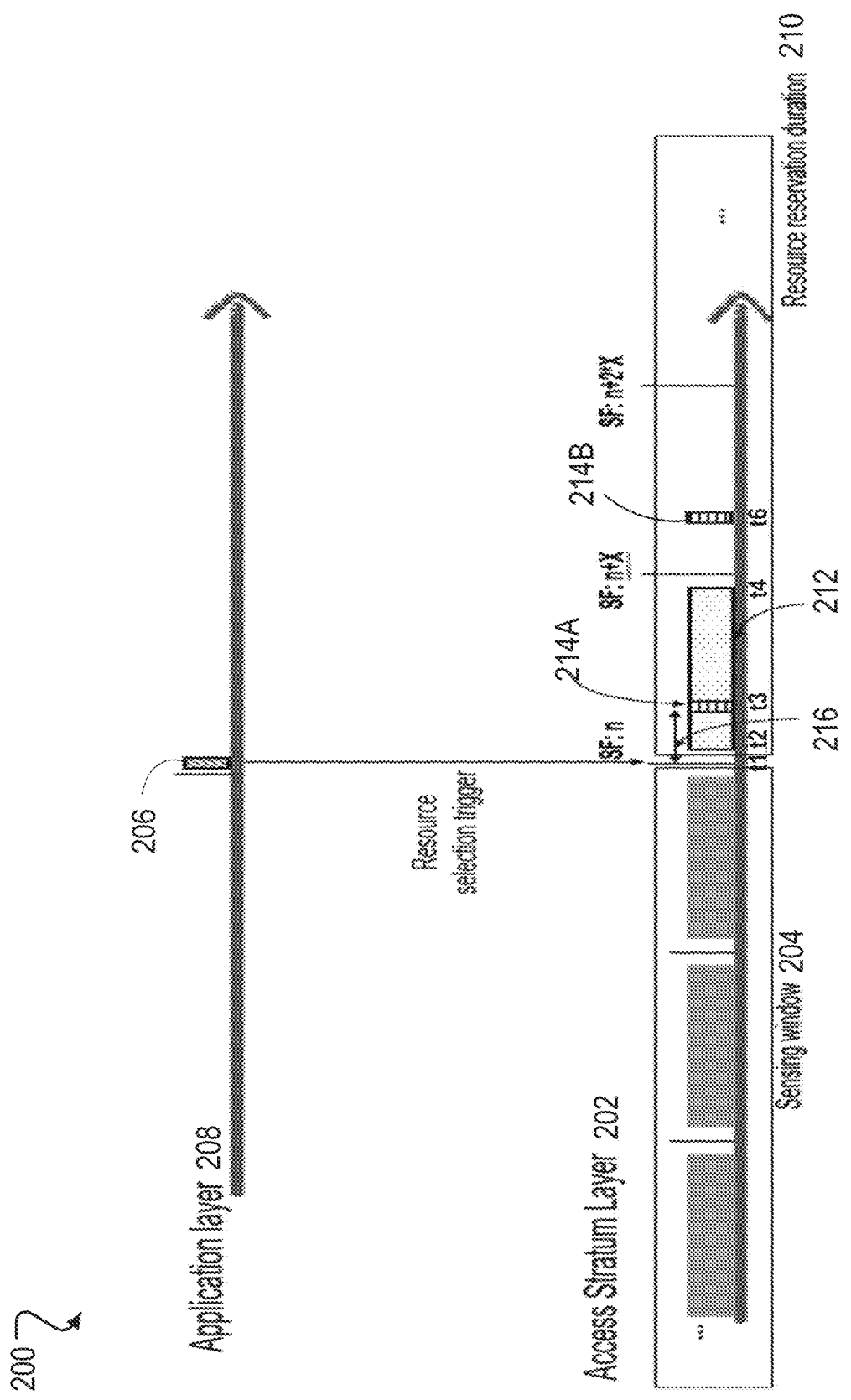
FIGS. 2A, 2B illustrate a solution for reducing latency in a vehicle-to-everything (V2X) network, according to some implementations of the present disclosure.
Figure 2B:
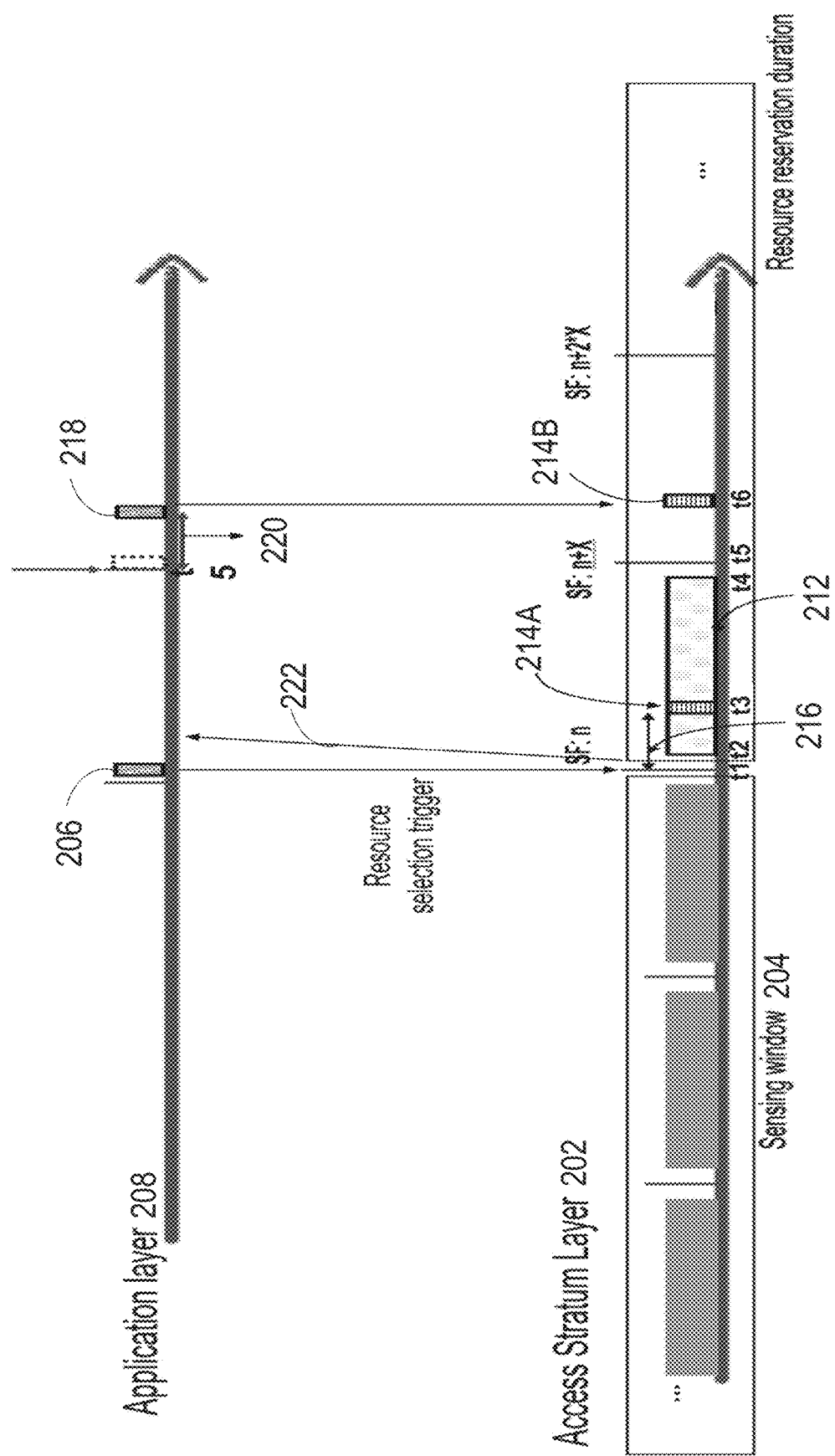

FIGS. 2A, 2B illustrate a solution for reducing latency in a V2X network, according to some implementations. More specifically, FIG. 2A illustrates an example scenario 200 that illustrates latency that can occur in UE autonomous scheduling mode. And FIG. 2B illustrates an implementation of the solution to reduce latency in the scenario 200.

Turning to FIG. 2A, in the scenario 200, a transmitter UE (not illustrated) is operating in the UE autonomous scheduling mode. Accordingly, an access stratum (AS) layer 202 executes sensing or partial-sensing based resource selection. More specifically, during a sensing window 204, the AS layer 202 performs sensing in order to identify resources that can be used for the sidelink interface. The AS layer 202 performs the sensing until a resource selection trigger is detected. In the scenario 200, the resource selection trigger is the receipt of UL data (e.g., an uplink packet) 206 from an application layer 208. In response to detecting the resource selection trigger, the AS layer 202 starts a resource reservation duration 210.

As shown in FIG. 2A, the resource reservation duration 210 includes a plurality of resource selection windows, e.g., resource selection window 212, during which the AS layer 202 selects a transmission resource (e.g., a time-frequency resource). In some examples, a length of the resource selection windows is configured by the network. For instance, a length of the resource selection window 212 is (t2, t4). In the scenario 200, the AS layer 202 selects a transmission resource 214A in the resource selection window 212. The transmission resource 214A starts at time t3. By selecting the transmission resource 214A, the AS layer 202 selects the same transmission resource in each subsequent window. For example, in the SF: n+X, a transmission resource 214B, which starts at t6, is selected.

However, there is a delay between the start of a resource selection window (i.e., the earliest time at which the UE can transmit UL data) and the selected resource (i.e., the time at which the UE transmits the UL data). As shown in FIG. 2A, there is a latency 216 between the start of SF: n and t3 (i.e., the time of the transmission resource 214A). As a result, there is a latency in the transmission of UL data.

In some embodiments, the AS layer 202 is configured to identify a latency in the transmission of UL data. In one example, the AS layer 202 detects the latency after a periodic sidelink grant is allocated for the V2X service. In response to detecting the latency, the AS layer 202 is configured to perform a remedial action. In one example, the AS layer 202 provides information indicative of the latency to the application layer 208. The information indicative of the latency can include a time value of the latency (e.g., in milliseconds). Additionally and/or alternatively, the information indicative of the latency can include an instruction to the application layer 208 to adjust a data sampling time.

In some embodiments, the application layer 208 is configured to receive information indicative of latency from the AS layer 202. In response, the application layer 208 is configured to adjust a data sampling time based on the information reported by the AS layer 202.

FIG. 2B illustrates an implementation of this solution in the scenario 200. As shown in FIG. 2B, the AS layer 202 detects the latency 216, perhaps after the transmission resource is selected. In response to detecting the latency, the AS layer 202 sends information 222 indicative of the latency to the application layer 208. The application layer 208, in response to receiving the information 222, performs an action based on the information 222. In one example, the application layer 208 the action involves changing, perhaps based on the information 222, a frequency at which the UL data is sampled. The new sampling period provides the UL data to the AS layer 202 at a time closer to the selected resource than the original sampling period.

As shown in FIG. 2B, under the original sampling period, a second UL data would have been provided to the AS layer 202 at a time t5. However, the application layer adjusts the sampling period by a time 220. Thus, under the new sampling period, a second UL data 218 is provided to the AS layer 202 at or near t6, thereby significantly reducing or eliminating the latency of length approximately equal to time 220. Note that the AS layer 202 reuses the previously selected transmission resource 214 for new adjusted V2X packets. That is, the AS layer 202 reuses the previous sidelink grant for the new V2X packet without latency.

One potential benefit, among others, of using latency information to adjust sampling period for uplink data is providing accurate information for uplink transmission in latency-sensitive contexts. In a V2X example, one UE (e.g., vehicle) may need to provide real-time positioning information to another UE (e.g., vehicle) or device. For fast-moving vehicles, the difference in the vehicle's position between a time at which the vehicle's position is originally sampled at the application layer and a time at which the positioning data is actually transmitted using the selected resource at the access stratum layer can be significant. The solution described above is one example described in the present disclosure that results in reduced latency between sampling time and transmission time to provide the most up-to-date information for uplink transmission in latency-sensitive contexts.

Turning to voice-over-cellular technology, in LTE and NR, voice packets are transmitted using a connected mode discontinuous reception (CDRX) scheme. A CDRX scheme defines a periodic CDRX-period that includes a CDRX-On Duration during which the UE receives an UL grant to transmit UL data in a PUSCH (also during the CDRX-On Duration). The network typically configures CDRX with a 40 millisecond period, and periodically schedules UL voice packets within the CDRX-On Duration. However, UEs operating using a CDRX scheme can suffer from latency. The network configures a CDRX-On Duration offset, without knowing when the UL voice packets are ready for transmission. Thus, a voice codec generates voice packets and pushes the generated voice packets to a layer-2 (L2) buffer in baseband. The voice codec continues to generate voice packets until an UL grant in the CDRX On Duration, which causes additional latency.

Figure 3A:
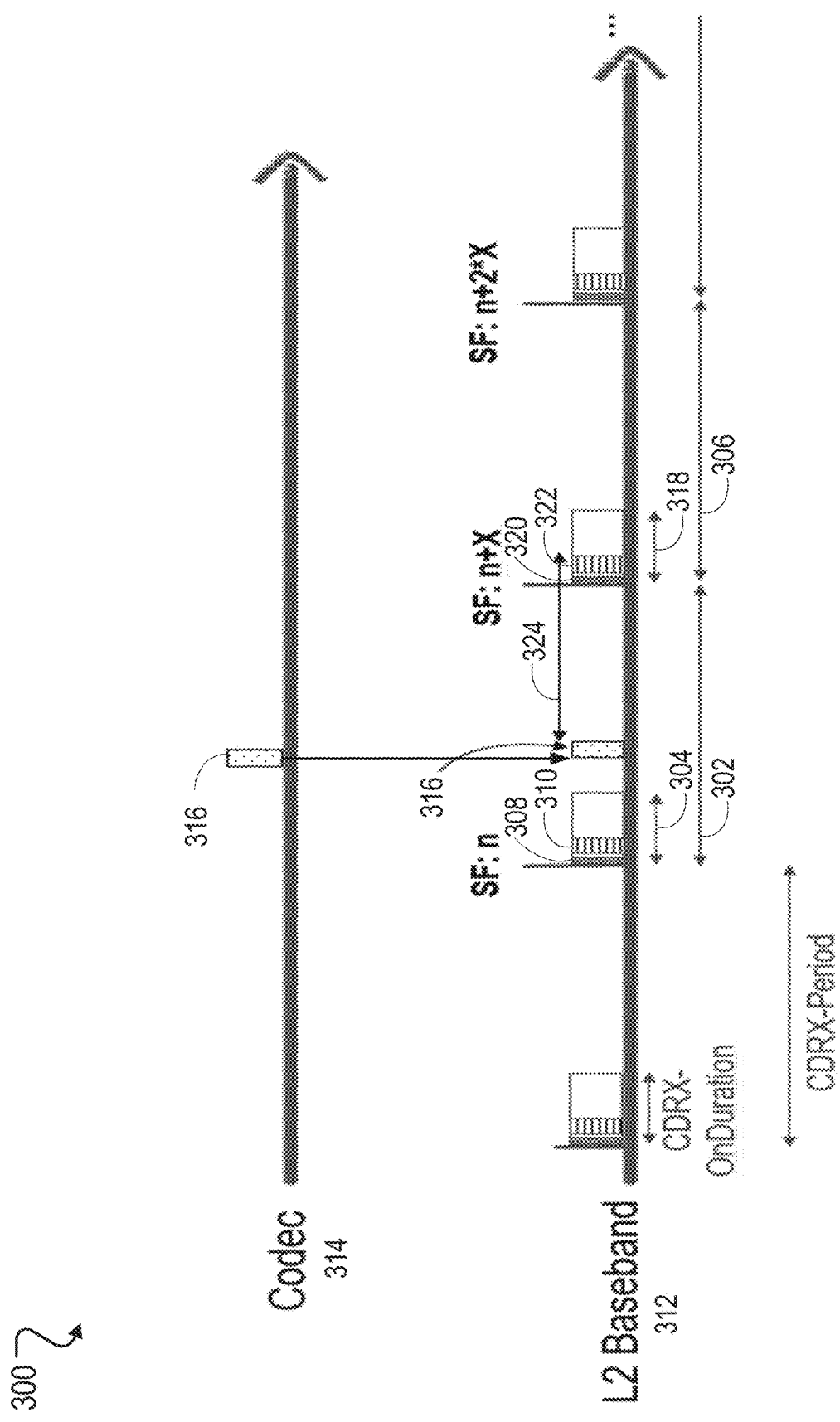
FIGS. 3A, 3B illustrate a solution for reducing latency in voice over cellular technology, according to some implementations of the present disclosure.
Figure 3B:
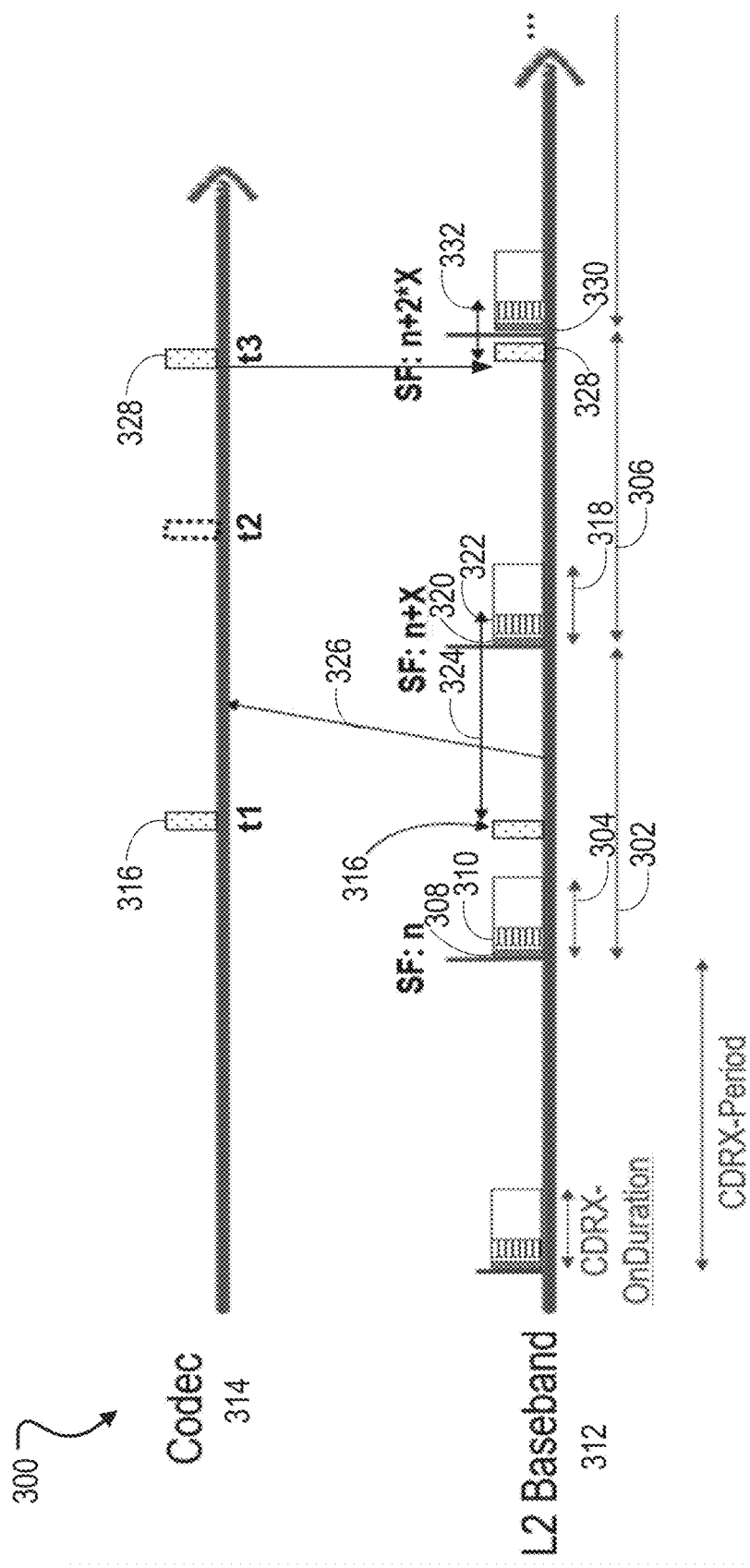

FIGS. 3A, 3B illustrate a solution for reducing latency in voice over cellular technology, according to some implementations. More specifically, FIG. 3A illustrates an example scenario 300 that illustrates latency that can occur in voice over cellular technology. And FIG. 3B illustrates an implementation of the solution to reduce latency in the scenario 300.

Turning to FIG. 3A, in the scenario 300, a UE is operating according to a CDRX scheme. The CDRX scheme includes a periodic CDRX-period, e.g., CDRX-period 302, that includes CDRX-On Duration, e.g., CDRX-On Duration 304. Each CDRX-period may align with a subframe. For example, the CDRX-period 302 corresponds to a subframe "n," and a CDRX-period 306 corresponds to subframe "n+X," and so on.

As shown in FIG. 3A, during the CDRX-On Duration 304, the UE receives an UL grant 308 for an UL transmission in a PUSCH 310. As also shown in FIG. 3A, in this scenario, a L2 baseband 312 receives a packet (e.g., a voice packet) 316 from a codec 314. However, the packet 316 is received after the CDRX-On Duration 304 has expired. As a result, the packet 316 remains in the L2 buffer until a next CDRX-On Duration 318, which occurs in the CDRX-period 306. In the CDRX-On Duration 318, the UE receives an UL grant 320 for an UL transmission in a PUSCH 322. The L2 layer provides the buffered packet for transmission using the grant provided by the UL grant 320. Given that the packet is buffered in the L2 buffer until the next UL grant is received, the communication scheme suffers from latency. For example, in the scenario 300, the transmitting UE suffers from a latency 324.

In some embodiments, the L2 baseband 312 is configured to determine an UL transmission timing based on the CDRX scheme configuration and/or a time at which a packet, e.g., packet 316, is received. The L2 baseband 312 is also configured to identify a latency based on the UL transmission timing. Further, the L2 baseband 312 is configured to provide information indicative of the latency to the codec 314, perhaps in response to identifying the latency. In some embodiments, the codec 314 is configured to adjust a sampling time according to the information reported from the L2 baseband 312. In some embodiments, the L2 baseband 312 is configured to re-evaluate the UL transmission timing and update the latency in certain scenarios, such as CDRX reconfiguration or cell handover.

FIG. 3B illustrates an implementation of this solution in the scenario 300. As shown in FIG. 3B, after receiving the packet 316, the L2 baseband 312 determines an UL transmission timing based on the CDRX scheme configuration and/or a time at which the packet 316 was received. The L2 baseband 312 identifies the latency 324 based on the UL transmission timing. In response to identifying the latency 324, the L2 baseband 312 provides information 326 indicative of the latency 324 to the codec 314. The codec 314 adjusts the packet sampling time based on the information 326. Accordingly, instead of sending a second packet 328 at time t2 (according to the original sampling time), the codec 314 sends the second packet 328 at time t3. As shown in FIG. 3B, a latency 332 between the time at which the second packet 328 is received and a subsequent UL grant 330 is reduced. Specifically, the latency 332 is shorter than the latency 324.

Turning to video/audio traffic, one approach to reducing latency in video/audio traffic is to use configured grants to schedule the transmission of the video/audio traffic. In this approach, the network schedules a configured grant for uplink and the UE assembles video/audio packets with the configured grant. However, this solution of using configured grants still suffers from latency.

FIGS. 4A, 4B illustrate a solution for reducing latency in voice/video communications, according to some implementations. More specifically, FIG. 4A illustrates an example scenario 400 that illustrates latency that can occur in voice/video communications. And FIG. 4B illustrates an implementation of the solution to reduce latency in the scenario 400.

Turning to FIG. 4A, in the scenario 400, a baseband 402 of a transmitting UE is configured to receive configured grants (CGs) from a network 404. The configured grants may be received periodically and may schedule periodic uplink grants for uplink transmissions. In the scenario 400, the baseband 402, at time t1, receives UL data (e.g., audio/video data) 406 for transmission. The baseband 402, at time t2, receives a CG 408 that schedules an uplink grant for transmission in a PUSCH 410 at time t3. As shown in FIG. 4A, there is a latency 412 between time t1 at which the UL data 406 is received for transmission and a time t3 at which the UL data 406 is transmitted.

In some embodiments, the baseband 402 is configured to determine an uplink transmission timing. Further, the baseband 402 is configured to identify a latency based on the uplink transmission timing. For example, the baseband 402 may calculate the latency between the time at which UL data is received for transmission and the uplink transmission timing. In response to identifying the latency, the baseband 402 is configured to provide information indicative of the latency to a layer that generated the UL data (e.g., video/audio codec). In some embodiments, the layer is configured to adjust a sampling time based on the latency reported from the baseband 402. In some embodiments, the baseband 402 is configured to re-evaluate the timing and update the latency in certain scenarios, e.g., after configured grant reconfiguration or cell handover.

FIG. 4B illustrates an implementation of this solution in the scenario 400. After receiving the UL data 406 and/or the CG 408, the baseband 402 identifies the latency 412 based on the timing of the UL data 406 and/or the CG 408. In response to identifying the latency 412, the baseband 402 provides information indicative of the latency 412 to the layer that provided the UL data 406. The layer adjusts the sampling time based on the information. Accordingly, instead of receiving second UL data 414 at time t4 (according to the original sampling time and as represented by dashed arrow 420), the baseband 402 receives the second UL data 414 at time t6, which is after a time t5 at which a second CG 416 is received. As shown in FIG. 4B, a latency between the time at which the second UL data 414 is received and a time at which the data is transmitted is reduced. The second CG 416 schedules an UL transmission in PUSCH 418 at time t7.

Figure 5:
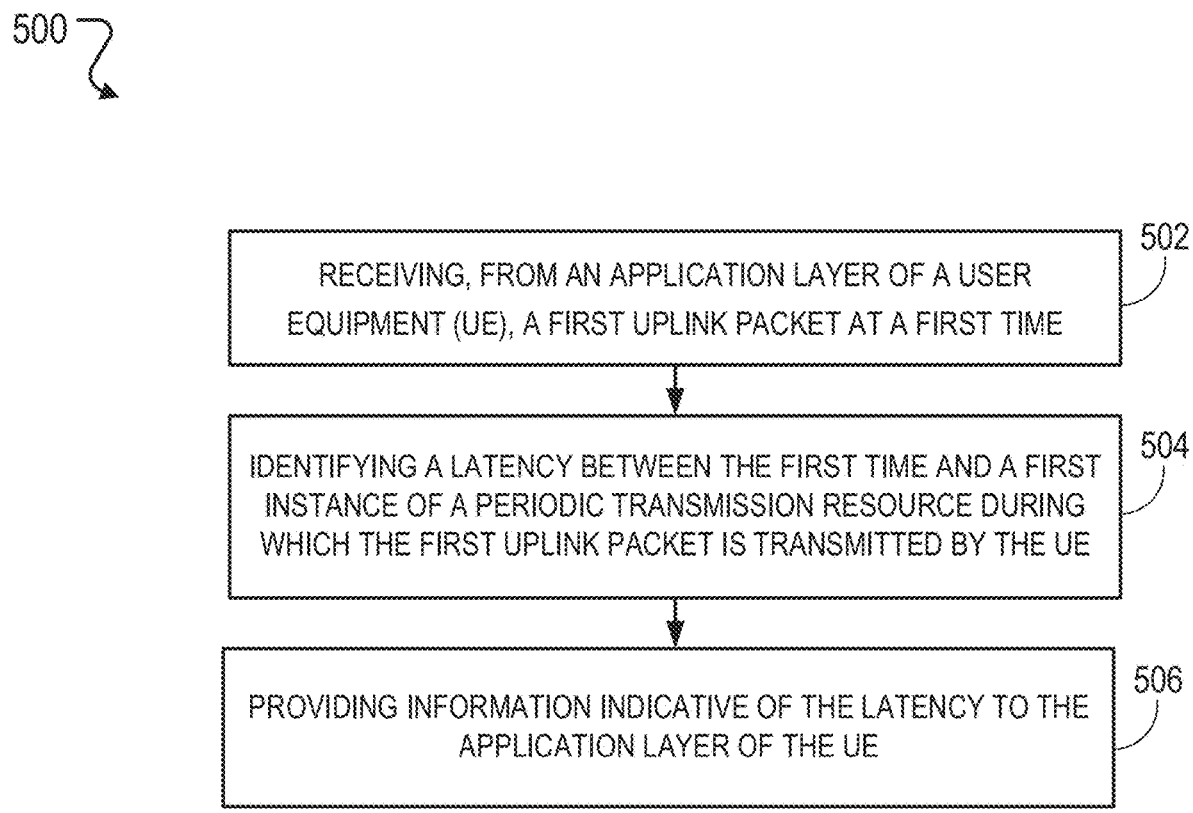
FIG. 5 illustrates a flowchart of an example method, according to some implementations of the present disclosure.

FIG. 5 illustrates a flowchart of an example method 500, according to some implementations. For clarity of presentation, the description that follows generally describes method 500 in the context of the other figures in this description. For example, method 500 can be performed by a UE 102 of FIG. 1. It will be understood that method 500 can be performed, for example, by any suitable system, environment, software, hardware, or a combination of systems, environments, software, and hardware, as appropriate. In some implementations, various steps of method 500 can be run in parallel, in combination, in loops, or in any order.

At 502, method 500 involves receiving, from an application layer of a user equipment (UE), a first uplink packet at a first time.

At 504, method 500 involves identifying a latency between the first time and a first instance of a periodic transmission resource during which the first uplink packet is transmitted by the UE.

At step 506, method 500 involves providing information indicative of the latency to the application layer of the UE.

In some implementations, the latency is a first latency, and where method 500 further involves receiving, from the application layer, a second uplink packet at a second time, wherein a second latency between the second time and a second instance of the periodic transmission resource is smaller than the first latency.

In some implementations, the information indicative of the latency comprises a value of the latency in milliseconds.

In some implementations, the information indicative of the latency comprises an instruction to adjust a packet sampling time by the application layer.

In some implementations, method 500 further involves receiving, at a second time, a first configured grant (CG) that schedules the first instance of the periodic transmission resource, wherein the second time occurs after the first time.

In some implementations, method 500 further involves receiving, at a third time, a second CG that schedules a second instance of the periodic transmission resource; receiving, from the application layer, a second uplink packet at a fourth time that occurs after the third time; and preparing the second uplink packet for transmission using the second instance of the periodic transmission resource.

In some implementations, the UE is operating in a cellular vehicle-to-everything (V2X) network, and method 500 further involves: selecting, for the periodic transmission resource, one or more time-frequency resources within a resource selection window.

In some implementations, method 500 further involves receiving connected mode discontinuous reception (CDRX) configuration information that defines a periodic CDRX ON duration; and receiving the first uplink packet between a first instance of the periodic CDRX ON duration and a second instance of the periodic CDRX ON duration.

In some implementations, method 500 further involves receiving, during the second instance of the periodic CDRX ON duration, an uplink grant that schedules the first instance of the periodic transmission resource, where a second instance of the periodic transmission resource occurs during the first instance of the CDRX ON period.

In some implementations, the periodic transmission resource is scheduled within a Physical Uplink Shared Channel (PUSCH).

Also disclosed are one or more systems of one or more computers configured to perform particular operations or actions by virtue of having software, firmware, hardware, or a combination of them installed on the system that in operation causes or cause the system to perform the actions of the method 500. One or more computer programs can be configured to perform particular operations or actions by virtue of including instructions that, when executed by data processing apparatus, cause the apparatus to perform the actions of the method 500.

Other embodiments of this aspect include corresponding computer systems, apparatus, and computer programs recorded on one or more computer storage devices, each configured to perform the actions of the method 500.

Figure 6:
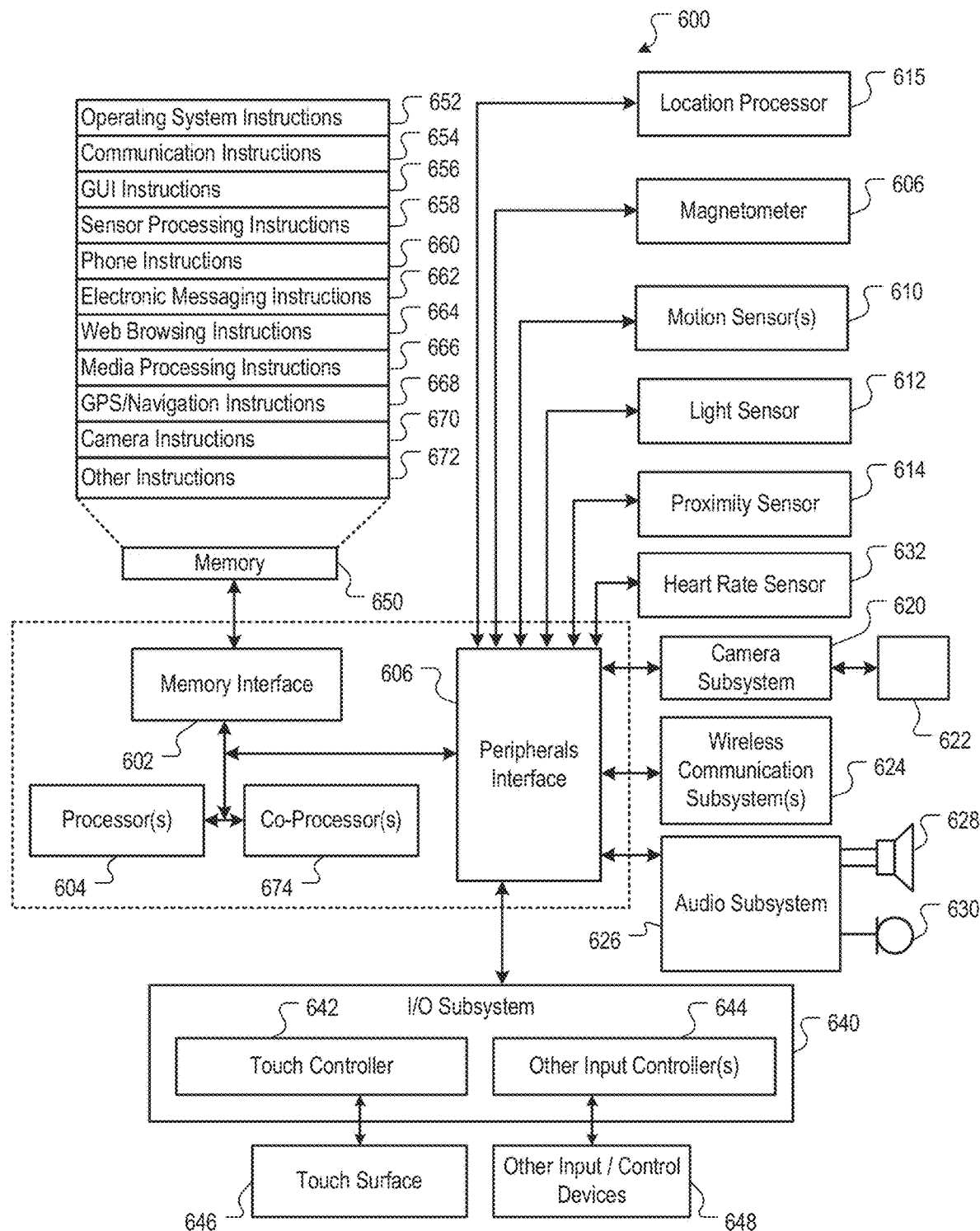
FIG. 6 is a block diagram of an example device architecture, according to some implementations of the present disclosure.

FIG. 6 is a block diagram of an example device architecture 600 for implementing the features and processes described in reference to FIGS. 1-5. For example, the architecture 600 can be used to implement a user equipment (UE). Architecture 600 may be implemented in any device for generating the features described in reference to FIGS. 1-5, including but not limited to desktop computers, server computers, portable computers, smart phones, tablet computers, game consoles, wearable computers, set top boxes, media players, smart TVs, and the like.

The architecture 600 can include a memory interface 602, one or more data processor 604, one or more data co-processors 674, and a peripherals interface 606. The memory interface 602, the processor(s) 604, the co-processor(s) 674, and/or the peripherals interface 606 can be separate components or can be integrated in one or more integrated circuits. One or more communication buses or signal lines may couple the various components.

The processor(s) 604 and/or the co-processor(s) 674 can operate in conjunction to perform the operations described herein. For instance, the processor(s) 604 can include one or more central processing units (CPUs) that are configured to function as the primary computer processors for the architecture 600. As an example, the processor(s) 604 can be configured to perform generalized data processing tasks of the architecture 600. Further, at least some of the data processing tasks can be offloaded to the co-processor(s) 674. For example, specialized data processing tasks, such as processing motion data, processing image data, encrypting data, and/or performing certain types of arithmetic operations, can be offloaded to one or more specialized co-processor(s) 674 for handling those tasks. In some cases, the processor(s) 604 can be relatively more powerful than the co-processor(s) 674 and/or can consume more power than the co-processor(s) 674. This can be useful, for example, as it enables the processor(s) 604 to handle generalized tasks quickly, while also offloading certain other tasks to co-processor(s) 674 that may perform those tasks more efficiency and/or more effectively. In some cases, a co-processor(s) can include one or more sensors or other components (e.g., as described herein), and can be configured to process data obtained using those sensors or components, and provide the processed data to the processor(s) 604 for further analysis.

Sensors, devices, and subsystems can be coupled to peripherals interface 606 to facilitate multiple functionalities. For example, a motion sensor 610, a light sensor 612, and a proximity sensor 614 can be coupled to the peripherals interface 606 to facilitate orientation, lighting, and proximity functions of the architecture 600. For example, in some implementations, a light sensor 612 can be utilized to facilitate adjusting the brightness of a touch surface 646. In some implementations, a motion sensor 610 can be utilized to detect movement and orientation of the device. For example, the motion sensor 610 can include one or more accelerometers (e.g., to measure the acceleration experienced by the motion sensor 610 and/or the architecture 600 over a period of time), and/or one or more compasses or gyros (e.g., to measure the orientation of the motion sensor 610 and/or the mobile device). In some cases, the measurement information obtained by the motion sensor 610 can be in the form of one or more a time-varying signals (e.g., a time-varying plot of an acceleration and/or an orientation over a period of time). Further, display objects or media may be presented according to a detected orientation (e.g., according to a "portrait" orientation or a "landscape" orientation). In some cases, a motion sensor 610 can be directly integrated into a co-processor 674 configured to processes measurements obtained by the motion sensor 610. For example, a co-processor 674 can include one more accelerometers, compasses, and/or gyroscopes, and can be configured to obtain sensor data from each of these sensors, process the sensor data, and transmit the processed data to the processor(s) 604 for further analysis.

Other sensors may also be connected to the peripherals interface 606, such as a temperature sensor, a biometric sensor, or other sensing device, to facilitate related functionalities. As an example, as shown in FIG. 6, the architecture 600 can include a heart rate sensor 632 that measures the beats of a user's heart. Similarly, these other sensors also can be directly integrated into one or more co-processor(s) 674 configured to process measurements obtained from those sensors.

A location processor 615 (e.g., a GNSS receiver chip) can be connected to the peripherals interface 606 to provide geo-referencing. An electronic magnetometer 616 (e.g., an integrated circuit chip) can also be connected to the peripherals interface 606 to provide data that may be used to determine the direction of magnetic North. Thus, the electronic magnetometer 616 can be used as an electronic compass.

A camera subsystem 620 and an optical sensor 622 (e.g., a charged coupled device [CCD] or a complementary metal-oxide semiconductor [CMOS] optical sensor) can be utilized to facilitate camera functions, such as recording photographs and video clips.

Communication functions may be facilitated through one or more communication subsystems 624. The communication subsystem(s) 624 can include one or more wireless and/or wired communication subsystems. For example, wireless communication subsystems can include radio frequency receivers and transmitters and/or optical (e.g., infrared) receivers and transmitters. As another example, wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data.

The specific design and implementation of the communication subsystem 624 can depend on the communication network(s) or medium(s) over which the architecture 600 is intended to operate. For example, the architecture 600 can include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. The wireless communication subsystems can also include hosting protocols such that the architecture 600 can be configured as a base station for other wireless devices. As another example, the communication subsystems 624 may allow the architecture 600 to synchronize with a host device using one or more protocols, such as, for example, the TCP/IP protocol, HTTP protocol, UDP protocol, and any other known protocol.

An audio subsystem 626 can be coupled to a speaker 628 and one or more microphones 630 to facilitate voice-enabled functions, such as voice recognition, voice replication, digital recording, and telephony functions.

An I/O subsystem 640 can include a touch controller 642 and/or other input controller(s) 644. The touch controller 642 can be coupled to a touch surface 646. The touch surface 646 and the touch controller 642 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch surface 646. In one implementations, the touch surface 646 can display virtual or soft buttons and a virtual keyboard, which can be used as an input/output device by the user.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In some implementations, the architecture 600 can present recorded audio and/or video files, such as MP3, AAC, and MPEG video files. In some implementations, the architecture 600 can include the functionality of an MP3 player and may include a pin connector for tethering to other devices. Other input/output and control devices may be used.

A memory interface 602 can be coupled to a memory 650. The memory 650 can include high-speed random access memory or non-volatile memory, such as one or more magnetic disk storage devices, one or more optical storage devices, or flash memory (e.g., NAND, NOR). The memory 650 can store an operating system 652, such as Darwin, RTXC, LINUX, UNIX, OS X, WINDOWS, ANDROID, or an embedded operating system such as VxWorks. The operating system 652 can include instructions for handling basic system services and for performing hardware dependent tasks. In some implementations, the operating system 652 can include a kernel (e.g., UNIX kernel).

The memory 650 can also store communication instructions 654 to facilitate communicating with one or more additional devices, one or more computers or servers, including peer-to-peer communications. The communication instructions 654 can also be used to select an operational mode or communication medium for use by the device, based on a geographic location (obtained by the GPS/Navigation instructions 668) of the device. The memory 650 can include graphical user interface instructions 656 to facilitate graphic user interface processing, including a touch model for interpreting touch inputs and gestures; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes; camera instructions 670 to facilitate camera-related processes and functions; and other instructions 672 for performing some or all of the processes described herein.

Each of the above identified instructions and applications can correspond to a set of instructions for performing one or more functions described herein. These instructions need not be implemented as separate software programs, procedures, or modules. The memory 650 can include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices: magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems.

Figure 7:
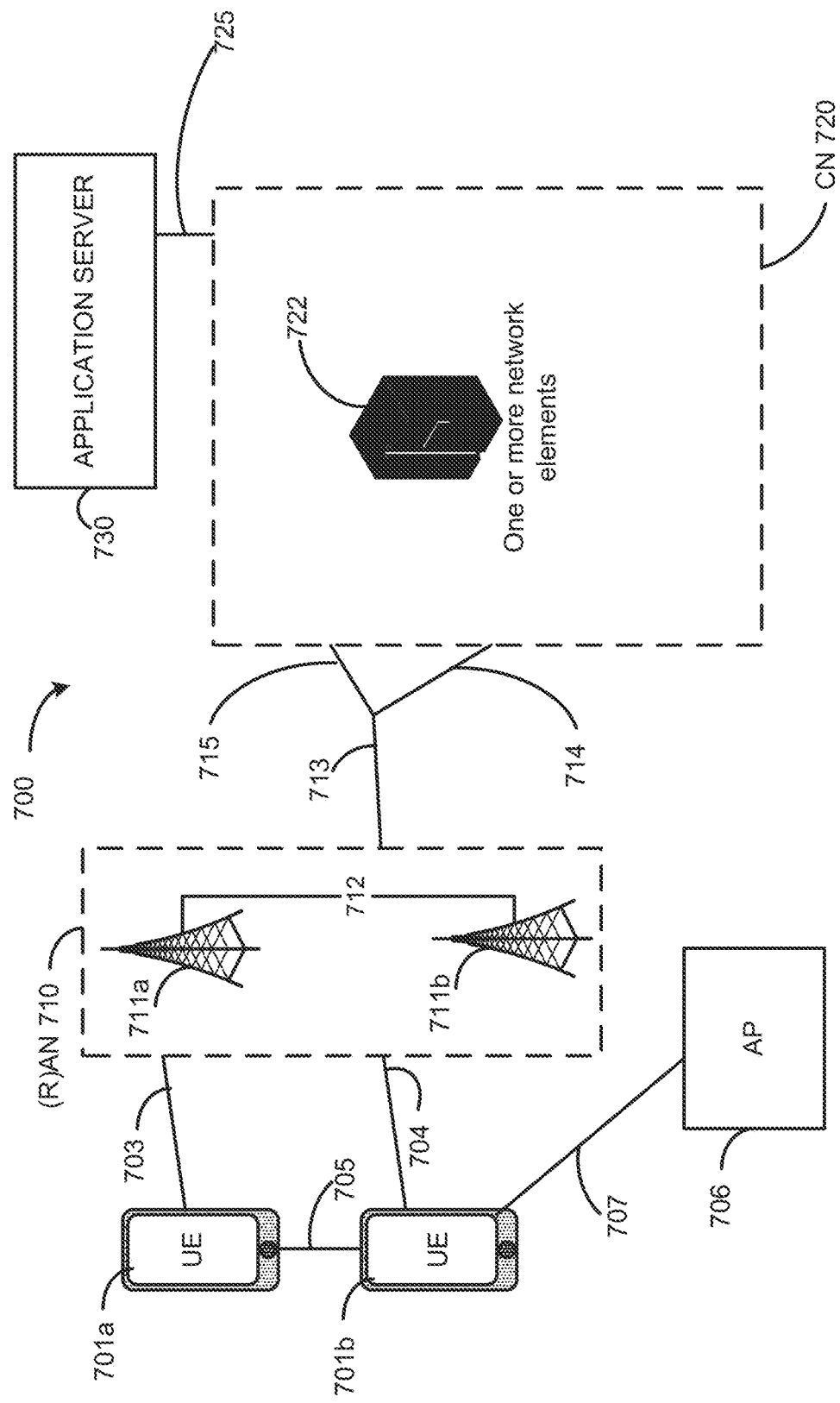
FIG. 7 illustrates an example of a wireless communication system, according to some implementations of the present disclosure.

FIG. 7 illustrates an example of a wireless communication system 700. For purposes of convenience and without limitation, the example system 700 is described in the context of Long Term Evolution (LTE) and Fifth Generation (5G) New Radio (NR) communication standards as defined by the Third Generation Partnership Project (3GPP) technical specifications. More specifically, the wireless communication system 700 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 700 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

As shown by FIG. 7, the system 700 includes UE 701a and UE 701b (collectively referred to as "UEs 701" or "UE 701"). In this example, UEs 701 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 701 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 may be configured to connect, for example, communicatively couple, with RAN 710. In embodiments, the RAN 710 may be an NG RAN or a 5G RAN, an E-UTRAN, a non-terrestrial cell, or a legacy RAN, such as a UTRAN or GERAN. As used herein, the term "NG RAN" or the like may refer to a RAN 710 that operates in an NR or 5G system 700, and the term "E-UTRAN" or the like may refer to a RAN 710 that operates in an LTE or 4G system 700. The UEs 701 utilize connections (or channels) 703 and 704, respectively, each of which comprises a physical communications interface or layer (discussed in further detail below).

In this example, the connections 703 and 704 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In embodiments, the UEs 701 may directly exchange communication data via a ProSe interface 705. The ProSe interface 705 may alternatively be referred to as a SL interface 705 and may comprise one or more logical channels, including but not limited to a PSCCH, a PSSCH, a PSDCH, and a PSBCH.

The UE 701b is shown to be configured to access an AP 706 (also referred to as "WLAN node 706," "WLAN 706," "WLAN Termination 706," "WT 706" or the like) via connection 707. The connection 707 can comprise a local wireless connection, such as a connection consistent with any IEEE 802.11 protocol, wherein the AP 706 would comprise a wireless fidelity (Wi-Fi®) router. In this example, the AP 706 is shown to be connected to the Internet without connecting to the core network of the wireless system (described in further detail below). In various embodiments, the UE 701b, RAN 710, and AP 706 may be configured to utilize LWA operation and/or LWIP operation. The LWA operation may involve the UE 701b in RRC_CONNECTED being configured by a RAN node 711a-b to utilize radio resources of LTE and WLAN. LWIP operation may involve the UE 701b using WLAN radio resources (e.g., connection 707) via IPsec protocol tunneling to authenticate and encrypt packets (e.g., IP packets) sent over the connection 707. IPsec tunneling may include encapsulating the entirety of original IP packets and adding a new packet header, thereby protecting the original header of the IP packets.

The RAN 710 can include one or more AN nodes or RAN nodes 711a and 711b (collectively referred to as "RAN nodes 711" or "RAN node 711") that enable the connections 703 and 704. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 711 that operates in an NR or 5G system 700 (for example, a gNB), and the term "E-UTRAN node" or the like may refer to a RAN node 711 that operates in an LTE or 4G system 700 (e.g., an eNB). According to various embodiments, the RAN nodes 711 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 711 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 711; a MAC/PHY split wherein RRC, PDCP, RLC, and MAC layers are operated by the CRAN/vBBUP and the PHY layer is operated by individual RAN nodes 711; or a "lower PHY" split wherein RRC, PDCP, RLC, MAC layers and upper portions of the PHY layer are operated by the CRAN/vBBUP and lower portions of the PHY layer are operated by individual RAN nodes 711. This virtualized framework allows the freed-up processor cores of the RAN nodes 711 to perform other virtualized applications. In some implementations, an individual RAN node 711 may represent individual gNB-DUs that are connected to a gNB-CU via individual F1 interfaces (not shown by FIG. 7). In these implementations, the gNB-DUs may include one or more remote radio heads or RFEMs (see, e.g., FIG. 6), and the gNB-CU may be operated by a server that is located in the RAN 710 (not shown) or by a server pool in a similar manner as the CRAN/vBBUP. Additionally or alternatively, one or more of the RAN nodes 711 may be next generation eNBs (ng-eNBs), which are RAN nodes that provide E-UTRA user plane and control plane protocol terminations toward the UEs 701, and are connected to a 5GC via an NG interface (discussed infra).

In V2X scenarios one or more of the RAN nodes 711 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 701 (vUEs 701). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 711 can terminate the air interface protocol and can be the first point of contact for the UEs 701. In some embodiments, any of the RAN nodes 711 can fulfill various logical functions for the RAN 710 including, but not limited to, radio network controller (RNC) functions such as radio bearer management, uplink and downlink dynamic radio resource management and data packet scheduling, and mobility management.

In embodiments, the UEs 701 can be configured to communicate using OFDM communication signals with each other or with any of the RAN nodes 711 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 to the UEs 701, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 701 and the RAN nodes 711 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

To operate in the unlicensed spectrum, the UEs 701 and the RAN nodes 711 may operate using LAA, eLAA, and/or feLAA mechanisms. In these implementations, the UEs 701 and the RAN nodes 711 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 701 RAN nodes 711, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 701, AP 706, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 701 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 701. The PDCCH carries information about the transport format and resource allocations related to the PDSCH channel, among other things. It may also inform the UEs 701 about the transport format, resource allocation, and HARQ information related to the uplink shared channel. Typically, downlink scheduling (assigning control and shared channel resource blocks to the UE 701b within a cell) may be performed at any of the RAN nodes 711 based on channel quality information fed back from any of the UEs 701. The downlink resource assignment information may be sent on the PDCCH used for (e.g., assigned to) each of the UEs 701.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 711 may be configured to communicate with one another via interface 712. In embodiments where the system 700 is an LTE system, the interface 712 may be an X2 interface 712. The X2 interface may be defined between two or more RAN nodes 711 (e.g., two or more eNBs and the like) that connect to EPC 720, and/or between two eNBs connecting to EPC 720. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 701 from an SeNB for user data; information of PDCP PDUs that were not delivered to a UE 701; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 700 is a 5G or NR system, the interface 712 may be an Xn interface 712. The Xn interface is defined between two or more RAN nodes 711 (e.g., two or more gNBs and the like) that connect to 5GC 720, between a RAN node 711 (e.g., a gNB) connecting to 5GC 720 and an eNB, and/or between two eNBs connecting to 5GC 720. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface: mobility support for UE 701 in a connected mode (e.g., CM-CONNECTED) including functionality to manage the UE mobility for connected mode between one or more RAN nodes 711. The mobility support may include context transfer from an old (source) serving RAN node 711 to new (target) serving RAN node 711; and control of user plane tunnels between old (source) serving RAN node 711 to new (target) serving RAN node 711. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 710 is shown to be communicatively coupled to a core network-in this embodiment, core network (CN) 720. The CN 720 may comprise a plurality of network elements 722, which are configured to offer various data and telecommunications services to customers/subscribers (e.g., users of UEs 701) who are connected to the CN 720 via the RAN 710. The components of the CN 720 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 720 may be referred to as a network slice, and a logical instantiation of a portion of the CN 720 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 730 may be an element offering applications that use IP bearer resources with the core network (e.g., UMTS PS domain, LTE PS data services, etc.). The application server 730 can also be configured to support one or more communication services (e.g., VoIP sessions, PTT sessions, group communication sessions, social networking services, etc.) for the UEs 701 via the EPC 720.

In embodiments, the CN 720 may be a 5GC (referred to as "5GC 720" or the like), and the RAN 710 may be connected with the CN 720 via an NG interface 713. In embodiments, the NG interface 713 may be split into two parts, an NG user plane (NG-U) interface 714, which carries traffic data between the RAN nodes 711 and a UPF, and the S1 control plane (NG-C) interface 715, which is a signaling interface between the RAN nodes 711 and AMFs.

In embodiments, the CN 720 may be a 5G CN (referred to as "5GC 720" or the like), while in other embodiments, the CN 720 may be an EPC). Where CN 720 is an EPC (referred to as "EPC 720" or the like), the RAN 710 may be connected with the CN 720 via an S1 interface 713. In embodiments, the S1 interface 713 may be split into two parts, an S1 user plane (S1-U) interface 714, which carries traffic data between the RAN nodes 711 and the S-GW, and the S1-MME interface 715, which is a signaling interface between the RAN nodes 711 and MMEs.

Figure 8:
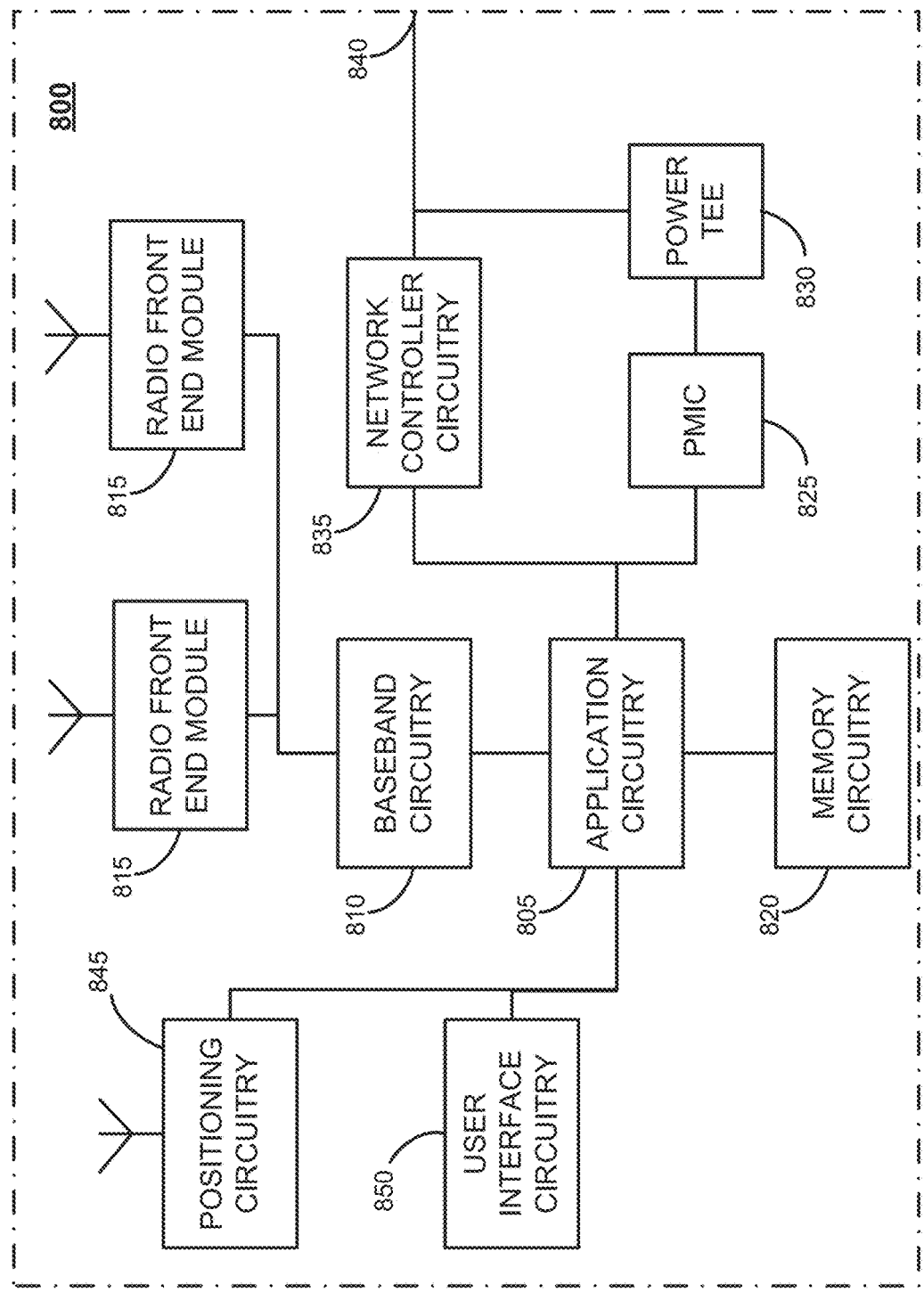
FIG. 8 illustrates an example of infrastructure equipment, according to some implementations of the present disclosure.

FIG. 8 illustrates an example of infrastructure equipment 800 in accordance with various embodiments. The infrastructure equipment 800 (or "system 800") may be implemented as a base station, radio head, non-terrestrial base station, RAN node such as the RAN nodes 711 and/or AP 706 shown and described previously, application server(s) 730, and/or any other element/device discussed herein. In other examples, the system 800 could be implemented in or by a UE.

The system 800 includes application circuitry 805, baseband circuitry 810, one or more radio front end modules (RFEMs) 815, memory circuitry 820, power management integrated circuitry (PMIC) 825, power tee circuitry 830, network controller circuitry 835, network interface connector 840, satellite positioning circuitry 845, and user interface 850. In some embodiments, the device 800 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 805 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 805 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 805 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 805 may comprise, or may be, a special-purpose processor/controller to operate according to the various embodiments herein. As examples, the processor(s) of application circuitry 805 may include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. Such as the ARM Cortex-A family of processors and the ThunderX2® provided by Cavium™, Inc.; a MIPS-based design from MIPS Technologies, Inc. Such as MIPS Warrior P-class processors; and/or the like. In some embodiments, the system 800 may not utilize application circuitry 805, and instead may include a special-purpose processor/controller to process IP data received from an EPC or 5GC, for example.

In some implementations, the application circuitry 805 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 805 may comprise logic blocks or logic fabric, and other interconnected resources that may be programmed to perform various functions, such as the procedures, methods, functions, etc. Of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. In look-up-tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 810 are discussed infra with regard to FIG. 7.

User interface circuitry 850 may include one or more user interfaces designed to enable user interaction with the system 800 or peripheral component interfaces designed to enable peripheral component interaction with the system 800. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 815 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 911 of FIG. 9 infra), and the RFEM may be connected to multiple antennas. In alternative implementations, both mmWave and sub-mmWave radio functions may be implemented in the same physical RFEM 815, which incorporates both mmWave antennas and sub-mmWave.

The memory circuitry 820 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 820 may be implemented as one or more of solder down packaged integrated circuits, socketed memory modules and plug-in memory cards.

The PMIC 825 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 830 may provide for electrical power drawn from a network cable to provide both power supply and data connectivity to the infrastructure equipment 800 using a single cable.

The network controller circuitry 835 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 800 via network interface connector 840 using a physical connection, which may be electrical (commonly referred to as a "copper interconnect"), optical, or wireless. The network controller circuitry 835 may include one or more dedicated processors and/or FPGAs to communicate using one or more of the aforementioned protocols. In some implementations, the network controller circuitry 835 may include multiple controllers to provide connectivity to other networks using the same or different protocols.

The positioning circuitry 845 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry

845 may include a Micro-Technology for Positioning, Navigation, and Timing (Micro-PNT) IC that uses a master timing clock to perform position tracking/estimation without GNSS assistance. The positioning circuitry 845 may also be part of, or interact with, the baseband circuitry 810 and/or RFEMs 815 to communicate with the nodes and components of the positioning network. The positioning circuitry 845 may also provide position data and/or time data to the application circuitry 805, which may use the data to synchronize operations with various infrastructure (e.g., RAN nodes 711, etc.), or the like.

The components shown by FIG. 8 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 9:
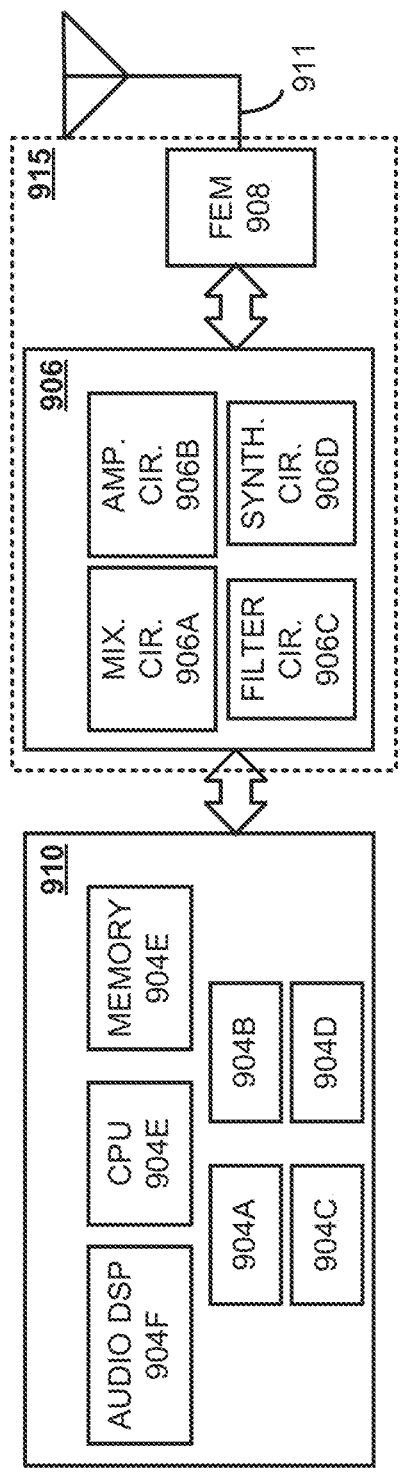
FIG. 9 illustrates example components of baseband circuitry and radio front end modules (RFEM), according to some implementations of the present disclosure.

FIG. 9 illustrates example components of baseband circuitry 910 and radio front end modules (RFEM) 915 in accordance with various embodiments. The baseband circuitry 910 corresponds to the baseband circuitry 810 of FIG. 8. The RFEM 915 corresponds to the RFEM 815 of FIG. 8. As shown, the RFEMs 915 may include Radio Frequency (RF) circuitry 906, front-end module (FEM) circuitry 908, antenna array 911 coupled together at least as shown.

The baseband circuitry 910 includes circuitry and/or control logic configured to carry out various radio/network protocol and radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 910 may include Fast-Fourier Transform (FFT), precoding, or constellation mapping/demapping functionality. In some embodiments, encoding/decoding circuitry of the baseband circuitry 910 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 910 is configured to process baseband signals received from a receive signal path of the RF circuitry 906 and to generate baseband signals for a transmit signal path of the RF circuitry 906. The baseband circuitry 910 is configured to interface with application circuitry 805 (see FIG. 8) for generation and processing of the baseband signals and for controlling operations of the RF circuitry 906. The baseband circuitry 910 may handle various radio control functions.

The aforementioned circuitry and/or control logic of the baseband circuitry 910 may include one or more single or multi-core processors. For example, the one or more processors may include a 3G baseband processor 904A, a 4G/LTE baseband processor 904B, a 5G/NR baseband processor 904C, or some other baseband processor(s) 904D for other existing generations, generations in development or to be developed in the future (e.g., sixth generation (6G), etc.). In other embodiments, some or all of the functionality of baseband processors 904A-D may be included in modules stored in the memory 904G and executed via a Central Processing Unit (CPU) 904E. In other embodiments, some or all of the functionality of baseband processors 904A-D may be provided as hardware accelerators (e.g., FPGAs, ASICs, etc.) loaded with the appropriate bit streams or logic blocks stored in respective memory cells. In various embodiments, the memory 904G may store program code of a real-time OS (RTOS), which when executed by the CPU 904E (or other baseband processor), is to cause the CPU 904E (or other baseband processor) to manage resources of the baseband circuitry 910, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 910 includes one or more audio digital signal processor(s) (DSP) 904F. The audio DSP(s) 904F include elements for compression/decompression and echo cancellation and may include other suitable processing elements in other embodiments.

In some embodiments, each of the processors 904A-904E include respective memory interfaces to send/receive data to/from the memory 904G. The baseband circuitry 910 may further include one or more interfaces to communicatively couple to other circuitries/devices, such as an interface to send/receive data to/from memory external to the baseband circuitry 910; an application circuitry interface to send/receive data to/from the application circuitry 805 of FIG. 8); an RF circuitry interface to send/receive data to/from RF circuitry 906 of FIG. 9; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from a PMIC.

In alternate embodiments (which may be combined with the above described embodiments), baseband circuitry 910 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 910 may include protocol processing circuitry with one or more instances of control circuitry (not shown) to provide control functions for the digital baseband circuitry and/or radio frequency circuitry (e.g., the radio front end modules 915).

Although not shown by FIG. 9, in some embodiments, the baseband circuitry 910 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 910 and/or RF circuitry 906 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 910 and/or RF circuitry 906 are part of a Wi-Fi communication system. In the second example, the protocol processing circuitry would operate Wi-Fi MAC and logical link control (LLC) functions. The protocol processing circuitry may include one or more memory structures (e.g., 904) to store program code and data for operating the protocol functions, as well as one or more processing cores to execute the program code and perform various operations using the data. The baseband circuitry 910 may also support radio communications for more than one wireless protocol.

The various hardware elements of the baseband circuitry 910 discussed herein may be implemented, for example, as a solder-down substrate including one or more integrated circuits (ICs), a single packaged IC soldered to a main circuit board or a multi-chip module containing two or more ICs. In one example, the components of the baseband circuitry 910 may be suitably combined in a single chip or chipset, or disposed on a same circuit board. In another example, some or all of the constituent components of the baseband circuitry 910 and RF circuitry 906 may be implemented together such as, for example, a system on a chip (SoC) or System-in-Package (SiP). In another example, some or all of the constituent components of the baseband circuitry 910 may be implemented as a separate SoC that is communicatively coupled with and RF circuitry 906 (or multiple instances of RF circuitry 906). In yet another example, some or all of the constituent components of the baseband circuitry 910 and the application circuitry 805 may be implemented together as individual SoCs mounted to a same circuit board (e.g., a "multi-chip package").

In some embodiments, the baseband circuitry 910 may provide for communication compatible with one or more radio technologies. For example, in some embodiments, the baseband circuitry 910 may support communication with an E-UTRAN or other WMAN, a WLAN, a WPAN. Embodiments in which the baseband circuitry 910 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. To facilitate the communication with the wireless network. RF circuitry 906 may include a receive signal path, which may include circuitry to down-convert RF signals received from the FEM circuitry 908 and provide baseband signals to the baseband circuitry 910. RF circuitry 906 may also include a transmit signal path, which may include circuitry to up-convert baseband signals provided by the baseband circuitry 910 and provide RF output signals to the FEM circuitry 908 for transmission.

In some embodiments, the receive signal path of the RF circuitry 906 may include mixer circuitry 906a, amplifier circuitry 906b and filter circuitry 906c. In some embodiments, the transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 910 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 910 and may be filtered by filter circuitry 906c.

In some embodiments, the mixer circuitry 906a of the receive signal path and the mixer circuitry 906a of the transmit signal path may include two or more mixers and may be arranged for quadrature downconversion and upconversion, respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a of the transmit signal path may be arranged for direct downconversion and direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 910 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 910 or the application circuitry 805 depending on the desired output frequency. In some embodiments, a divider control input (e.g., N) may be determined from a look-up table based on a channel indicated by the application circuitry 805.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path, which may include circuitry configured to operate on RF signals received from antenna array 911, amplify the received signals and provide the amplified versions of the received signals to the RF circuitry 906 for further processing. FEM circuitry 908 may also include a transmit signal path, which may include circuitry configured to amplify signals for transmission provided by the RF circuitry 906 for transmission by one or more of antenna elements of antenna array 911. In various embodiments, the amplification through the transmit or receive signal paths may be done solely in the RF circuitry 906, solely in the FEM circuitry 908, or in both the RF circuitry 906 and the FEM circuitry 908.

In some embodiments, the FEM circuitry 908 may include a TX/RX switch to switch between transmit mode and receive mode operation. The FEM circuitry 908 may include a receive signal path and a transmit signal path. The receive signal path of the FEM circuitry 908 may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission by one or more antenna elements of the antenna array 911.

The antenna array 911 comprises one or more antenna elements, each of which is configured convert electrical signals into radio waves to travel through the air and to convert received radio waves into electrical signals. For example, digital baseband signals provided by the baseband circuitry 910 is converted into analog RF signals (e.g., modulated waveform) that will be amplified and transmitted via the antenna elements of the antenna array 911 including one or more antenna elements (not shown). The antenna elements may be omnidirectional, direction, or a combination thereof. The antenna elements may be formed in a multitude of arranges as are known and/or discussed herein. The antenna array 911 may comprise microstrip antennas or printed antennas that are fabricated on the surface of one or more printed circuit boards. The antenna array 911 may be formed in as a patch of metal foil (e.g., a patch antenna) in a variety of shapes, and may be coupled with the RF circuitry 906 and/or FEM circuitry 908 using metal transmission lines or the like.

Processors of the application circuitry 805 and processors of the baseband circuitry 910 may be used to execute elements of one or more instances of a protocol stack. For example, processors of the baseband circuitry 910, alone or in combination, may be used execute Layer 3, Layer 2, or Layer 1 functionality, while processors of the application circuitry 805 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 10:
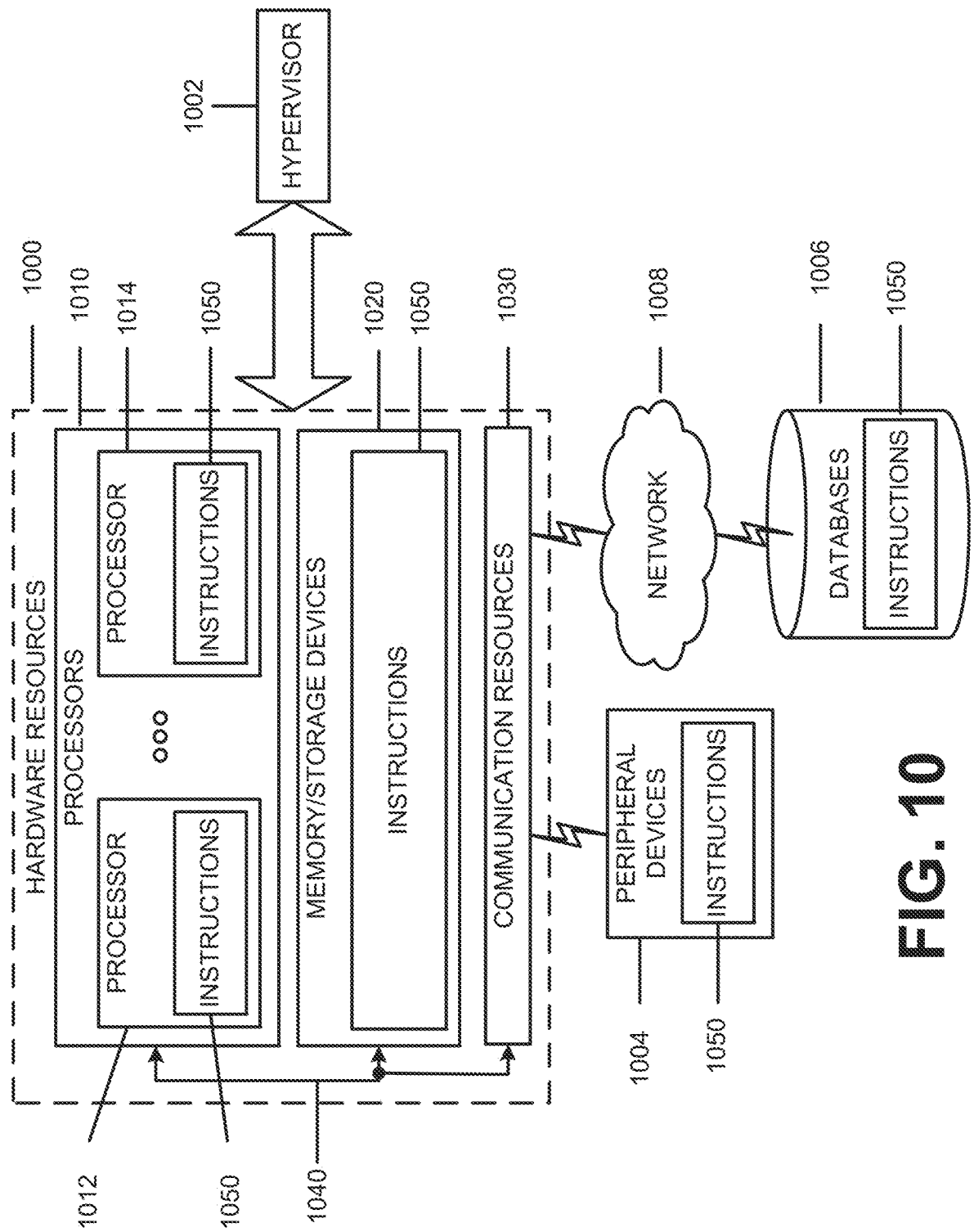
FIG. 10 is a block diagram illustrating components able to read instructions from a machine-readable or computer-readable medium (e.g., a non-transitory machine-readable storage medium) and perform any one or more of the methodologies discussed herein, according to some implementations of the present disclosure.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processor(s) 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via USB), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

We claim:

1. A method comprising:
   receiving, from an application layer of a user equipment (UE), a first uplink packet at a first time;
   identifying a latency between the first time and a first instance of a periodic transmission resource during which the first uplink packet is transmitted by the UE; and
   providing information indicative of the latency to the application layer of the UE.

2. The method of claim 1, wherein the latency is a first latency, and wherein the method further comprises:
   receiving, from the application layer, a second uplink packet at a second time, wherein a second latency between the second time and a second instance of the periodic transmission resource is smaller than the first latency.

3. The method of claim 1, wherein the information indicative of the latency comprises a value of the latency in milliseconds.

4. The method of claim 1, wherein the information indicative of the latency comprises an instruction to adjust a packet sampling time by the application layer.

5. The method of claim 1, further comprising:
   receiving, at a second time, a first configured grant (CG) that schedules the first instance of the periodic transmission resource, wherein the second time occurs after the first time.

6. The method of claim 5, further comprising:
   receiving, at a third time, a second CG that schedules a second instance of the periodic transmission resource;
   receiving, from the application layer, a second uplink packet at a fourth time that occurs after the third time; and
   preparing the second uplink packet for transmission using the second instance of the periodic transmission resource.

7. The method of claim 1, wherein the UE is operating in a cellular vehicle-to-everything (V2X) network, and wherein the method further comprises:
   selecting, for the periodic transmission resource, one or more time-frequency resources within a resource selection window.

8. The method of claim 1, further comprising:
   receiving connected mode discontinuous reception (CDRX) configuration information that defines a periodic CDRX ON duration; and
   receiving the first uplink packet between a first instance of the periodic CDRX ON duration and a second instance of the periodic CDRX ON duration.

9. The method of claim 8, further comprising:
   receiving, during the second instance of the periodic CDRX ON duration, an uplink grant that schedules the first instance of the periodic transmission resource, wherein a second instance of the periodic transmission resource occurs during the first instance of the CDRX ON period.

10. The method of claim 1, wherein the periodic transmission resource is scheduled within a Physical Uplink Shared Channel (PUSCH).

11. A user equipment (UE) comprising:
    one or more processors configured to perform operations comprising:
      receiving, from an application layer, a first uplink packet at a first time;
      identifying a latency between the first time and a first instance of a periodic transmission resource during which the first uplink packet is transmitted by the UE; and
      providing information indicative of the latency to the application layer of the UE.

12. The UE of claim 11, wherein the latency is a first latency, and wherein the operations further comprise:
    receiving, from the application layer, a second uplink packet at a second time, wherein a second latency between the second time and a second instance of the periodic transmission resource is smaller than the first latency.

13. The UE of claim 11, wherein the information indicative of the latency comprises a value of the latency in milliseconds.

14. The UE of claim 11, wherein the information indicative of the latency comprises an instruction to adjust a packet sampling time by the application layer.

15. The UE of claim 11, the operations further comprising:
    receiving, at a second time, a first configured grant (CG) that schedules the first instance of the periodic transmission resource, wherein the second time occurs after the first time.

16. The UE of claim 15, the operations further comprising:
    receiving, at a third time, a second CG that schedules a second instance of the periodic transmission resource;
    receiving, from the application layer, a second uplink packet at a fourth time that occurs after the third time; and
    preparing the second uplink packet for transmission using the second instance of the periodic transmission resource.

17. The UE of claim 11, wherein the UE is operating in a cellular vehicle-to-everything (V2X) network, and wherein the operations further comprise:
  selecting, for the periodic transmission resource, one or more time-frequency resources within a resource selection window.

18. The UE of claim 11, the operations further comprising:
  receiving connected mode discontinuous reception (CDRX) configuration information that defines a periodic CDRX ON duration; and
  receiving the first uplink packet between a first instance of the periodic CDRX ON duration and a second instance of the periodic CDRX ON duration.

19. The UE of claim 18, the operations further comprising receiving, during the second instance of the periodic CDRX ON duration, an uplink grant that schedules the first instance of the periodic transmission resource, wherein a second instance of the periodic transmission resource occurs during the first instance of the CDRX ON period.

20. A non-transitory computer-readable storage device having stored thereon instructions, which, when executed by a data processing apparatus, cause the data processing apparatus to perform operations comprising:
  receiving, from an application layer of a user equipment (UE), a first uplink packet at a first time;
  identifying a latency between the first time and a first instance of a periodic transmission resource during which the first uplink packet is transmitted by the UE; and
  providing information indicative of the latency to the application layer of the UE.

* * * * *